(12) United States Patent
Oran et al.

(10) Patent No.: US 8,711,854 B2
(45) Date of Patent: Apr. 29, 2014

(54) MONITORING AND CORRECTING UPSTREAM PACKET LOSS

(75) Inventors: David Oran, Acton, MA (US); William VerSteeg, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/435,431

(22) Filed: Mar. 30, 2012

(65) Prior Publication Data

US 2012/0189007 A1    Jul. 26, 2012

Related U.S. Application Data

(63) Continuation of application No. 11/736,463, filed on Apr. 17, 2007, now abandoned, which is a continuation-in-part of application No. 11/735,930, filed on Apr. 16, 2007, now Pat. No. 7,681,101.

(51) Int. Cl.
*H04H 20/71* (2008.01)
*H04L 12/28* (2006.01)
*H04L 1/18* (2006.01)

(52) U.S. Cl.
USPC ........... 370/390; 370/312; 370/432; 370/389; 714/748

(58) Field of Classification Search
None
See application file for complete search history.

(56) References Cited

U.S. PATENT DOCUMENTS

| | | | |
|---|---|---|---|
| 3,840,862 A | 10/1974 | Ready | |
| 4,291,196 A | 9/1981 | Spaniol | |
| 4,426,682 A | 1/1984 | Riffe | |
| 4,802,085 A | 1/1989 | Levy | |
| 4,811,203 A | 3/1989 | Hamstra | |
| 5,155,824 A | 10/1992 | Edenfield | |
| 5,307,477 A | 4/1994 | Taylor | |
| 5,444,718 A | 8/1995 | Ejzak et al. | |
| 5,483,587 A | 1/1996 | Hogan | |
| 5,524,235 A | 6/1996 | Larson | |
| 5,551,001 A | 8/1996 | Cohen | |

(Continued)

FOREIGN PATENT DOCUMENTS

| CN | 1643857 A | 7/2005 |
|---|---|---|
| CN | 1947399 | 4/2007 |

(Continued)

OTHER PUBLICATIONS

Adamson et al, NACK-oriented reliable multicast (NORM), RFC 3941, Nov. 2004, IETF.org, pp. 1-31.*

(Continued)

*Primary Examiner* — Hassan Phillips
*Assistant Examiner* — Hicham Foud
(74) *Attorney, Agent, or Firm* — Merchant & Gould

(57) ABSTRACT

An upstream error controller monitors a media stream at a location upstream from an associated set of receivers receiving the media stream. The upstream error controller sends out suppression notices for any media packets lost upstream causing the receivers to suppress sending lost packet notices. In another embodiment, a repair point joins a primary multicast group with multiple receivers for receiving a native media stream. The repair point also joins a second multicast group receiving multicast backup data for retransmitting or repairing the native media stream that does not include an associated set of receivers. In yet another embodiment, the upstream error controller is used in combination with a hybrid packet repair scheme for adaptively switching among unicast retransmission, multicast retransmission, and Forward Error Correction (FEC).

14 Claims, 9 Drawing Sheets

(56) References Cited

U.S. PATENT DOCUMENTS

| | | | |
|---|---|---|---|
| 5,600,366 | A | 2/1997 | Schulman |
| 5,600,663 | A | 2/1997 | Ayanoglu et al. |
| 5,636,354 | A | 6/1997 | Lear |
| 5,673,253 | A | 9/1997 | Shaffer |
| 5,729,687 | A | 3/1998 | Rothrock |
| 5,734,861 | A | 3/1998 | Cohn |
| 5,784,362 | A | 7/1998 | Turina |
| 5,828,844 | A | 10/1998 | Civanlar |
| 5,870,763 | A | 2/1999 | Lomet |
| 5,914,757 | A | 6/1999 | Dean et al. |
| 5,926,227 | A | 7/1999 | Schoner |
| 5,933,195 | A | 8/1999 | Florencio |
| 5,933,593 | A | 8/1999 | Arun |
| 5,963,217 | A | 10/1999 | Grayson |
| 5,974,028 | A | 10/1999 | Ramakrishnan |
| 6,003,116 | A | 12/1999 | Morita |
| 6,031,818 | A | 2/2000 | Lo et al. |
| 6,034,746 | A | 3/2000 | Desai |
| 6,065,050 | A | 5/2000 | DeMoney |
| 6,119,205 | A | 9/2000 | Wicki |
| 6,137,834 | A | 10/2000 | Wine |
| 6,141,324 | A | 10/2000 | Abbott |
| 6,151,636 | A | 11/2000 | Schuster |
| 6,236,854 | B1 | 5/2001 | Bradshaw, Jr. |
| 6,278,716 | B1 | 8/2001 | Rubenstein |
| 6,289,054 | B1 | 9/2001 | Rhee |
| 6,301,249 | B1 | 10/2001 | Mansfield et al. |
| 6,332,153 | B1 | 12/2001 | Cohen |
| 6,445,717 | B1 | 9/2002 | Gibson et al. |
| 6,501,739 | B1 | 12/2002 | Cohen |
| 6,516,435 | B1 | 2/2003 | Tsunoda |
| 6,532,562 | B1 | 3/2003 | Chou et al. |
| 6,567,929 | B1 | 5/2003 | Bhagavath |
| 6,570,926 | B1 | 5/2003 | Agrawal |
| 6,594,798 | B1 | 7/2003 | Chou et al. |
| 6,608,820 | B1 | 8/2003 | Bradshaw, Jr. |
| 6,608,841 | B1 | 8/2003 | Koodli |
| 6,624,841 | B1 | 9/2003 | Buchner et al. |
| 6,643,496 | B1 | 11/2003 | Shimoyama |
| 6,650,652 | B1 | 11/2003 | Valencia |
| 6,671,262 | B1 | 12/2003 | Kung |
| 6,675,216 | B1 | 1/2004 | Quatrano |
| 6,677,864 | B2 | 1/2004 | Khayrallah |
| 6,711,128 | B1 | 3/2004 | Ramakrishnan |
| 6,721,290 | B1 | 4/2004 | Kondylis |
| 6,735,572 | B2 | 5/2004 | Landesmann |
| 6,744,785 | B2 | 6/2004 | Robinett |
| 6,766,418 | B1 | 7/2004 | Alexander |
| 6,771,644 | B1 | 8/2004 | Brassil |
| 6,775,247 | B1 | 8/2004 | Shaffer |
| 6,782,490 | B2 | 8/2004 | Maxemchuk |
| 6,792,047 | B1 | 9/2004 | Bixby |
| 6,804,244 | B1 | 10/2004 | Anandakumar |
| 6,816,469 | B1 | 11/2004 | Kung |
| 6,823,470 | B2 | 11/2004 | Smith |
| 6,839,325 | B2 | 1/2005 | Schmidl et al. |
| 6,865,157 | B1 | 3/2005 | Scott |
| 6,865,540 | B1 | 3/2005 | Faber |
| 6,876,734 | B1 | 4/2005 | Summers |
| 6,909,718 | B1 | 6/2005 | Aramaki et al. |
| 6,910,148 | B1 | 6/2005 | Ho |
| 6,925,068 | B1 | 8/2005 | Stanwood |
| 6,931,001 | B2 | 8/2005 | Deng |
| 6,931,113 | B2 | 8/2005 | Ortel |
| 6,937,569 | B1 | 8/2005 | Sarkar |
| 6,947,417 | B2 | 9/2005 | Laursen |
| 6,956,828 | B2 | 10/2005 | Simard |
| 6,959,075 | B2 | 10/2005 | Cutaia |
| 6,976,055 | B1 | 12/2005 | Shaffer |
| 6,989,856 | B2 | 1/2006 | Firestone |
| 6,996,097 | B1 | 2/2006 | Chou et al. |
| 7,003,086 | B1 | 2/2006 | Shaffer |
| 7,007,098 | B1 | 2/2006 | Smyth |
| 7,024,609 | B2 | 4/2006 | Wolfgang et al. |
| 7,084,898 | B1 | 8/2006 | Firestone |
| 7,114,002 | B1 | 9/2006 | Okumura |
| 7,127,487 | B1 | 10/2006 | Wang |
| 7,164,680 | B2 | 1/2007 | Loguinov |
| 7,180,896 | B1 | 2/2007 | Okumura |
| 7,224,702 | B2 | 5/2007 | Lee |
| 7,234,079 | B2 | 6/2007 | Cheng |
| 7,257,664 | B2 | 8/2007 | Zhang |
| 7,263,075 | B2 | 8/2007 | Roh |
| 7,296,205 | B2 | 11/2007 | Curcio |
| 7,324,527 | B1 | 1/2008 | Fraas |
| 7,333,439 | B2 | 2/2008 | Itoh et al. |
| 7,366,172 | B2 | 4/2008 | Chou et al. |
| 7,373,413 | B1 | 5/2008 | Nguyen |
| 7,376,880 | B2 | 5/2008 | Ichiki et al. |
| 7,379,653 | B2 | 5/2008 | Yap |
| 7,392,424 | B2 | 6/2008 | Ho |
| 7,397,759 | B2 | 7/2008 | Tan |
| 7,532,621 | B2 | 5/2009 | Birman |
| 7,562,277 | B2 | 7/2009 | Park |
| 7,599,363 | B2 | 10/2009 | Jang et al. |
| 7,676,591 | B2 | 3/2010 | Chan et al. |
| 7,681,101 | B2 | 3/2010 | Oran et al. |
| 7,697,514 | B2 | 4/2010 | Chou et al. |
| 7,707,303 | B2 | 4/2010 | Albers |
| 7,711,938 | B2 | 5/2010 | Wise |
| 7,747,921 | B2 | 6/2010 | DaCosta |
| 7,751,324 | B2 | 7/2010 | Vadakital et al. |
| 7,801,146 | B2 | 9/2010 | Aramaki et al. |
| 7,870,590 | B2 | 1/2011 | Jagadeesan |
| 7,877,660 | B2 | 1/2011 | VerSteeg |
| 7,886,073 | B2 | 2/2011 | Gahm |
| 7,889,654 | B2 | 2/2011 | Ramakrishnan et al. |
| 7,921,347 | B2 | 4/2011 | Kim et al. |
| 7,937,531 | B2 | 5/2011 | Mitra |
| 7,940,644 | B2 | 5/2011 | Oran |
| 7,940,777 | B2 | 5/2011 | Asati |
| 7,965,771 | B2 | 6/2011 | Wu |
| 8,031,701 | B2 | 10/2011 | Oran |
| 8,218,654 | B2 | 7/2012 | Cheng |
| 8,245,264 | B2 | 8/2012 | Toebes |
| 8,462,847 | B2 | 6/2013 | Wu et al. |
| 8,588,077 | B2 | 11/2013 | Oran |
| 2001/0000540 | A1 | 4/2001 | Cooper |
| 2002/0004841 | A1 | 1/2002 | Sawatari |
| 2002/0006137 | A1 | 1/2002 | Rabenko et al. |
| 2002/0010938 | A1 | 1/2002 | Zhang |
| 2002/0087976 | A1 | 7/2002 | Kaplan |
| 2002/0114332 | A1 | 8/2002 | Apostolopoulos |
| 2002/0126711 | A1 | 9/2002 | Robinett |
| 2002/0163918 | A1 | 11/2002 | Cline |
| 2003/0025786 | A1 | 2/2003 | Norsworthy |
| 2003/0025832 | A1 | 2/2003 | Swart |
| 2003/0076850 | A1 | 4/2003 | Jason, Jr. |
| 2003/0101408 | A1 | 5/2003 | Martinian |
| 2003/0158899 | A1 | 8/2003 | Hughes |
| 2003/0198195 | A1 | 10/2003 | Li |
| 2003/0231863 | A1 | 12/2003 | Eerenberg |
| 2003/0236903 | A1 | 12/2003 | Piotrowski |
| 2004/0057449 | A1 | 3/2004 | Black |
| 2004/0071128 | A1 | 4/2004 | Jang |
| 2004/0078624 | A1 | 4/2004 | Maxemchuk |
| 2004/0100937 | A1 | 5/2004 | Chen |
| 2004/0114576 | A1 | 6/2004 | Itoh |
| 2004/0143672 | A1 | 7/2004 | Padmanabham |
| 2004/0165527 | A1 | 8/2004 | Gu |
| 2004/0165710 | A1 | 8/2004 | DelHoyo |
| 2004/0196849 | A1 | 10/2004 | Aksu |
| 2004/0199659 | A1 | 10/2004 | Ishikawa |
| 2004/0213152 | A1 | 10/2004 | Matuoka |
| 2004/0244058 | A1 | 12/2004 | Carlucci |
| 2004/0255328 | A1 | 12/2004 | Baldwin |
| 2005/0058131 | A1 | 3/2005 | Samuels |
| 2005/0069102 | A1 | 3/2005 | Chang |
| 2005/0074007 | A1 | 4/2005 | Samuels |
| 2005/0078171 | A1 | 4/2005 | Firestone |
| 2005/0078698 | A1 | 4/2005 | Araya |
| 2005/0081244 | A1 | 4/2005 | Barrett |
| 2005/0099499 | A1 | 5/2005 | Braustein |
| 2005/0138372 | A1 | 6/2005 | Kajihara |

(56) References Cited

U.S. PATENT DOCUMENTS

| | | |
|---|---|---|
| 2005/0169174 A1 | 8/2005 | Apostolopoulos et al. |
| 2005/0198367 A1 | 9/2005 | Ettikan |
| 2005/0204242 A1 | 9/2005 | Chou et al. |
| 2005/0207406 A1 | 9/2005 | Reme |
| 2005/0226325 A1 | 10/2005 | Dei et al. |
| 2005/0244137 A1 | 11/2005 | Takashima |
| 2005/0249231 A1 | 11/2005 | Khan |
| 2005/0259803 A1 | 11/2005 | Khartabil |
| 2005/0265346 A1 | 12/2005 | Ho |
| 2005/0289623 A1 | 12/2005 | Midani |
| 2006/0020995 A1 | 1/2006 | Opie |
| 2006/0048193 A1 | 3/2006 | Jacobs |
| 2006/0072596 A1 | 4/2006 | Spilo et al. |
| 2006/0075084 A1 | 4/2006 | Lyon |
| 2006/0075443 A1 | 4/2006 | Eckert |
| 2006/0083263 A1 | 4/2006 | Jagadeesan |
| 2006/0085551 A1 | 4/2006 | Xie |
| 2006/0104458 A1 | 5/2006 | Kenoyer |
| 2006/0120378 A1 | 6/2006 | Usuki |
| 2006/0126667 A1 | 6/2006 | Smith |
| 2006/0143669 A1 | 6/2006 | Cohen |
| 2006/0159093 A1 | 7/2006 | Joo |
| 2006/0187914 A1 | 8/2006 | Gumaste |
| 2006/0188025 A1 | 8/2006 | Hannuksela |
| 2006/0189337 A1 | 8/2006 | Farrill |
| 2006/0200842 A1 | 9/2006 | Chapman et al. |
| 2006/0242240 A1 | 10/2006 | Parker |
| 2006/0242669 A1 | 10/2006 | Wogsberg |
| 2006/0259755 A1 | 11/2006 | Kenoyer |
| 2006/0279437 A1 | 12/2006 | Luby |
| 2007/0008934 A1 | 1/2007 | Balasubramanian |
| 2007/0009235 A1 | 1/2007 | Walters et al. |
| 2007/0044130 A1 | 2/2007 | Skoog |
| 2007/0076703 A1 | 4/2007 | Yoneda et al. |
| 2007/0098079 A1 | 5/2007 | Boyce |
| 2007/0110029 A1 | 5/2007 | Gilmore, II |
| 2007/0123284 A1 | 5/2007 | Schliwa-Bertling |
| 2007/0133435 A1 | 6/2007 | Eneroth |
| 2007/0200949 A1 | 8/2007 | Walker |
| 2007/0204320 A1 | 8/2007 | Wu |
| 2007/0214490 A1 | 9/2007 | Cheng |
| 2007/0268899 A1 | 11/2007 | Cankaya |
| 2007/0277219 A1 | 11/2007 | Toebes |
| 2007/0292107 A1 | 12/2007 | Yahata et al. |
| 2008/0022340 A1 | 1/2008 | Hannuksela et al. |
| 2008/0062990 A1 | 3/2008 | Oran |
| 2008/0189489 A1 | 8/2008 | Mitra |
| 2008/0192839 A1 | 8/2008 | Gahm |
| 2008/0225850 A1 | 9/2008 | Oran |
| 2008/0253369 A1 | 10/2008 | Oran |
| 2008/0256409 A1 | 10/2008 | Oran |
| 2008/0267078 A1 | 10/2008 | Farinacci |
| 2008/0310435 A1 | 12/2008 | Cagenius |
| 2009/0034627 A1 | 2/2009 | Rodriguez |
| 2009/0034633 A1 | 2/2009 | Rodriguez |
| 2009/0049361 A1 | 2/2009 | Koren |
| 2009/0055540 A1 | 2/2009 | Foti |
| 2009/0119722 A1 | 5/2009 | VerSteeg |
| 2009/0150715 A1 | 6/2009 | Pickens |
| 2009/0201803 A1 | 8/2009 | Filsfils |
| 2009/0201805 A1 | 8/2009 | Begen |
| 2009/0213726 A1 | 8/2009 | Asati |
| 2009/0217318 A1 | 8/2009 | VerSteeg et al. |
| 2010/0005360 A1 | 1/2010 | Begen |
| 2010/0036962 A1 | 2/2010 | Gahm |
| 2011/0131622 A1 | 6/2011 | Wu et al. |
| 2011/0161765 A1 | 6/2011 | Oran |
| 2014/0029628 A1 | 1/2014 | Oran |

FOREIGN PATENT DOCUMENTS

| | | |
|---|---|---|
| EP | 220845 | 8/2010 |
| WO | 2005/048519 A1 | 5/2005 |
| WO | 2009/058645 | 5/2009 |

OTHER PUBLICATIONS

Schulzrinne, H., "RTP: A Transport Protocol for Real-Time Applications," RFC 3550, Jul. 2003, 89 pgs.
Lehman et al., Active Reliable Multicast (ARM), 1998, IEEE, pp. 581-589.
Rey et al., "RTP Retransmission Payload Form—RFC 4588", Jul. 1, 2006, 29 pgs.
Written Opinion of the International Searching Authority for PCT/US09/032305 mailed Oct. 5, 2009, 17 pgs.
Chinese First Office Action dated Aug. 3, 2010 cited in Appl. No. 200880004738.8, 16 pgs.
Chinese Second Office Action dated May 20, 2011 cited in Appl. No. 200880004738.8, 11 pgs.
Chinese First Office Action dated Jul. 4, 2011 for Appl. No. 200780022360.X, 11 pgs.
European Office Action dated Oct. 27, 2011 cited in Appl. No. 08 728 919.5 6 pgs.
Chinese Third Office Action dated Oct. 28, 2011 cited in Appl. No. 200880004738.8, 9 pgs.
Chinese Fourth Office Action dated Feb. 22, 2012 cited in Appl. No. 200880004738.8, 7 pgs.
Chinese Second Office Action dated Jul. 2, 2012 for Appl. No. 200780022360.X, 12 pgs.
U.S. Office Action dated Jul. 16, 2010 cited in U.S. Appl. No. 11/674,093, 30 pgs.
U.S. Final Office Action dated Dec. 21, 2010 cited in U.S. Appl. No. 11/674,093, 23 pgs.
U.S. Office Action dated Jul. 16, 2012 cited in U.S. Appl. No. 11/674,093, 38 pgs.
U.S. Office Action dated Oct. 27, 2009 cited in U.S. Appl. No. 12/101,796, 45 pgs.
U.S. Office Action dated Jul. 26, 2010 cited in U.S. Appl. No. 12/101,796, 41 pgs.
U.S. Final Office Action dated Feb. 17, 2011 cited in U.S. Appl. No. 12/101,796, 36 pgs.
U.S. Office Action dated Sep. 27, 2011 cited in U.S. Appl. No. 12/168,772, 17 pgs.
U.S. Final Office Action dated Jan. 10, 2012 cited in U.S. Appl. No. 12/168,772, 15 pgs.
U.S. Office Action dated Oct. 31, 2012 cited in U.S. Appl. No. 13/043,437, 37 pgs.
Chinese Third Office Action dated Dec. 3, 2012 cited in Appl. No. 200780022360.X, 8 pgs.
Brassil, Jack, et al., "Structuring Internet Media Streams with Cueing Protocols," IEEE/ACM Transactions on Networking, IEEE/ACM New York, NY, vol. 10, No. 4, Aug. 2002, XP011077174; Abstract Only.
Castro H., et al., "Monitoring Emerging IPv6 Wireless Access Networks," IEEE Wireless Communications, IEEE Service Center, Piscataway, NJ, vol. 12, No. 1, Feb. 2005, XP011127719.
International Search Report for PCT/US08/80882 dated Mar. 3, 2009, 3 pgs.
International Preliminary Report on Patentability (1 pg.) and Written Opinion of the International Search Authority (6 pgs.) for PCT/US08/80882 dated May 4, 2010.
U.S. Office Action dated Jan. 2, 2013 cited in U.S. Appl. No. 13/016,773, 36 pgs.
U.S. Final Office Action dated Jan. 7, 2013 cited in U.S. Appl. No. 11/674,093, 26 pgs.
U.S. Final Office Action dated Apr. 11, 2013 cited in U.S. Appl. No. 13/043,437, 11 pgs.
U.S. Office Action dated Jun. 20, 2013 cited in U.S. Appl. No. 11/674,093, 25 pgs.
European Search Report dated Mar. 7, 2013 cited in Appl. No. 07814246.0, 9 pgs.
Wonyong Yoon et al., "A Combined Group/Tree Approach for Scalable Many-to-many Reliable Multicast," Proceedings IEEE Infocom., vol. 3, Jun. 23, 2002, pp. 1336-1345.
Victor O.K. Li et al., "Internet Multicast Routing and Transport Control Protocols," Proceedings of IEEE, vol. 90, No. 3, Mar. 1, 2002, pp. 360-391.

(56) References Cited

OTHER PUBLICATIONS

Hrishikesh Gossain et al., "Multicast: Wired to Wireless," IEEE Communications Magazine, IEEE Service Center, vol. 40, No. 6, Jun. 1, 2002, pp. 116-123.
A. Erramilli et al., "A Performance Analysis of Protocols for Multicast Communication in Broadband Packet Networks," XP010077385, Jun. 13, 1988, pp. 222-226.
Chinese Fourth Office Action dated Mar. 25, 2013 cited in Appl. No. 200780022360.X, 7 pgs.
Copending U.S. Appl. No. 14/045,813, filed Oct. 4, 2013 entitled "Retransmission-Based Stream Repair and Stream Join".
U.S. Office Action dated Apr. 9, 2013 cited in U.S. Appl. No. 11/831,906, 22 pgs.
U.S. Final Office Action dated Nov. 13, 2013 cited in U.S. Appl. No. 11/831,906, 32 pgs.
U.S. Final Office Action dated Dec. 9, 2013 cited in U.S. Appl. No. 12/168,772, 16 pgs.
U.S. Final Office Action dated Dec. 31, 2013 cited in U.S. Appl. No. 11/674,093, 8 pgs.

\* cited by examiner

UNICAST CONDITION 70A (62A)

| PKT SEQ # | # NACKS |
|---|---|
| 1 | 1 |
| 2 | 0 |
| 3 | 0 |
| 4 | 0 |
| 5 | 0 |
| 6 | 0 |
| 7 | 1 |
| ... | ... |

MULTICAST CONDITION 70B (62B)

| PKT SEQ # | # NACKS |
|---|---|
| 1 | 0 |
| 2 | 0 |
| 3 | 200 |
| 4 | 0 |
| 5 | 0 |
| 6 | 0 |
| 7 | 0 |
| ... | ... |

FEC CONDITION 70C (62C)

| PKT SEQ # | # NACKS |
|---|---|
| 1 | 30 |
| 2 | 50 |
| 3 | 0 |
| 4 | 0 |
| 5 | 0 |
| 6 | 30 |
| 7 | 0 |
| ... | ... |

COMBINATION UNICAST/MULTICAST CONDITION 70D (62D)

| PKT SEQ # | # NACKS |
|---|---|
| 1 | 2 |
| 2 | 1 |
| 3 | 0 |
| 4 | 130 |
| 5 | 5 |
| 6 | 0 |
| 7 | 1 |
| ... | ... |

BANDWIDTH OVERFLOW CONDITION 70E (62E)

| PKT SEQ # | # NACKS |
|---|---|
| 1 | 1 |
| 2 | 25 |
| 3 | 32 |
| 4 | 40 |
| 5 | 2 |
| 6 | 60 |
| 7 | 5 |
| ... | ... |

COMBINED UPSTREAM AND DOWNSTREAM PACKET LOSS TABLE (62F)

| PKT SEQ # (63A) | US NACKS | DS NACKS (63B) |
|---|---|---|
| 1 | 0 | 1 |
| 2 | 25 | 0 |
| 3 | 25 | 7 |
| 4 | 35 | 5 |
| 5 | 0 | 2 |
| 6 | 60 | 0 |
| 7 | 0 | 7 |
| ... | ... | ... |

FIG.7

MONITORING AND CORRECTING UPSTREAM PACKET LOSS

The following application is a continuation of U.S. patent application Ser. No. 11/736,463, filed Apr. 17, 2007, and entitled MONITORING AND CORRECTING UPSTREAM PACKET LOSS, which is a continuation-in-part claiming benefit of U.S. Pat. No. 7,681,101, filed Apr. 16, 2007, entitled HYBRID CORRECTION SCHEME FOR DROPPED PACKETS the disclosures of which are both incorporated by reference in their entireties.

TECHNICAL FIELD

The present disclosure relates generally to the field of networking.

BACKGROUND

Packet switch networks are now being used to transport streaming media, such as video or audio from a media server to multiple receivers, such as computer terminals and Set Top Boxes (STBs). However, packet switched networks typically use a best effort transport that may significantly delay or drop some packets. Retransmission schemes have been designed to retransmit the dropped or delayed media packets to receivers but may be inadequate to resolve or deal with certain packet switched network outages.

For example, media packets may be multicast by a media server to multiple different receivers. The packet switched network then automatically branches the multicast packets along different network paths to the different receivers in an associated multicast group. Problems arise when the multicast packets are lost upstream of branch points near the leaves of the delivery tree where the receivers are. For example, the upstream packet loss may cause a significant fraction of the receivers to send Negative ACKnowledgmets (NACKs) back to the media stream repair point. These numerous returned NACKs, all reporting the same loss, use up network bandwidth and can overwhelm the media stream repair point.

BRIEF DESCRIPTION OF THE DRAWINGS

FIG. 7 shows NACK tables that are used by the upstream error controller and the hybrid packet repair scheme.

DESCRIPTION OF EXAMPLE EMBODIMENTS

Overview

An upstream error controller monitors a media stream at a location upstream from an associated set of receivers receiving the media stream. The upstream error controller sends out suppression notices for any media packets lost upstream causing the receivers to suppress sending lost packet notices.

In another embodiment, a repair point joins a primary multicast group with multiple receivers for receiving a native media stream. The repair point also joins a second multicast group for receiving multicast backup data for retransmitting or repairing the native media stream that does not include an associated set of receivers.

In yet another embodiment, the upstream error controller is used in combination with a hybrid packet repair scheme that adaptively switches among unicast retransmission, multicast retransmission, and Forward Error Correction (FEC) depending on the receiver population and the nature of the error prompting the repair operation.

DESCRIPTION

Figure 1:
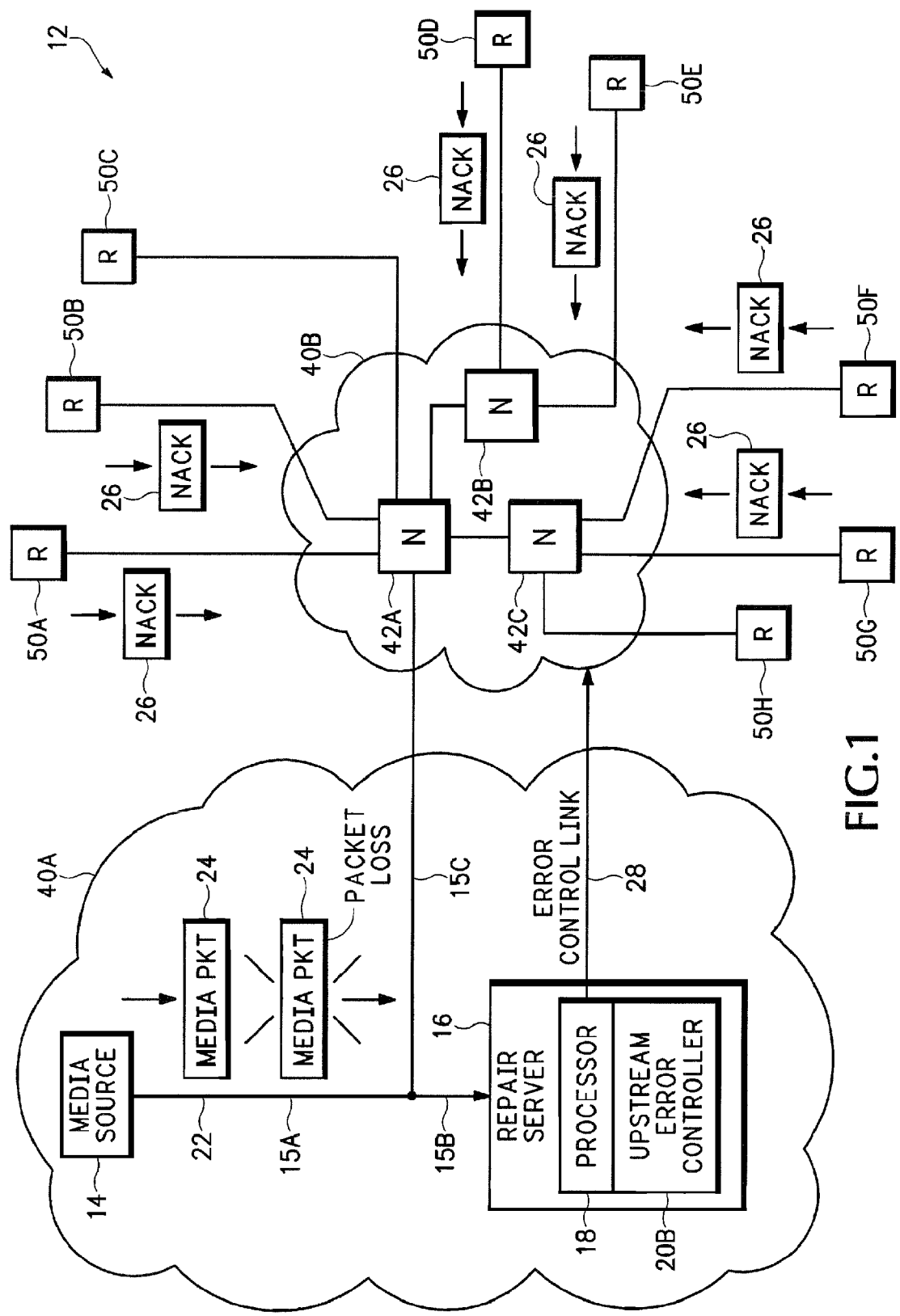
FIG. 1 is a block diagram of a network that uses an upstream error controller to handle upstream packet loss.

FIG. 1 shows an Internet network 12 that includes a packet switched network 40 having multiple different nodes 42A-42C. The nodes 42 may be routers, switches, gateways, or any other network processing device that directs packets 24 from media server 14 to different receivers 50A-50H. The media server 14 (media source) could store media locally or receive media from another server or media source via another network, satellite, cable, or any other communication media.

The receivers 50 can be any device that receives media packets 24. For example, the receives 50 could be Personal Computers (PCs), Set-Top Boxes (STBs), Personal Digital Assistants (PDAs), Voice Over Internet Protocol (VOIP) phones, Internet connected televisions, Digital Video Recorders (DVRs), cellular telephones, etc.

A repair server is alternatively referred to as a repair point 16 and receives and caches the media packets 24 from media stream 22 sent by media server 14 to the receivers 50. The packet switched network 40 includes an upstream portion 40A and a downstream portion 40B. The upstream portion 40A of the network is upstream of a significant fraction of the receivers 50 located in the downstream network portion 40B.

Upstream Packet Loss

Any combination of media packets 24 may be dropped, lost, and/or delayed for any number of different reasons and any number of different locations along the network paths from media server 14 to the different receivers 50. Any of the receivers 50 that do not successfully receive any of the media packets 24 may send associated Negative ACKnowledge (NACK) messages 26 back to the repair point 16.

A multicast media packet 24 lost in the upstream portion 40A of the network would likely not be received by any of the receivers 50 that are members of the same multicast group in an associated downstream network portion 40. Accordingly, every one of the receivers so in the participating multicast group would normally send back NACKs 26 to repair point 16. This implosion of NACK messages 26 would use up substantial network bandwidth and possibly overwhelm the repair point 16.

To stop NACK implosions, an upstream error controller 20B is operated by one or more processors 18 in the repair point 16. In one embodiment, the upstream error controller 20B is implemented as computer instructions in a memory that are executed by the processor 18. However, the operations of the controller 20B could be implemented in any type of logic device or circuitry.

One characteristic worth noting is that the repair point 16 is located in the upstream portion 40A of the network along with the media server 14 and typically receives the media packets 24 prior to the packets being forwarded through the downstream network portion 40B to the receivers 50. Accordingly, the repair point 16 will typically be able to detect an upstream loss or outage in media stream 22 prior to that loss being detected by the receivers 50. This is shown in FIG. 1 where a packet 24 lost on network branch 15A will be identified as a packet loss by repair point 16 on branch 15b and also identified as a packet loss by all of the receivers 50 stemming off of branch 15C.

The identified upstream packet loss indicates either the media packet 24 was indeed lost on a common branch 15A upstream of both the repair point 16 and the receivers 50, or the loss was due to a failure of an upstream interface of the repair point 16. The failure of the repair point 16 would be rare and usually detectable by some means that could take the repair point 16 offline for the affected media stream 22.

Accordingly, any packet detected as lost by the repair point 16 may be identified as an upstream loss by the upstream error controller 20B. There is no reason for the receivers 50 to issue NACKs 26 for such upstream losses since the repair point 16 is already aware of the packet loss.

Figure 2:
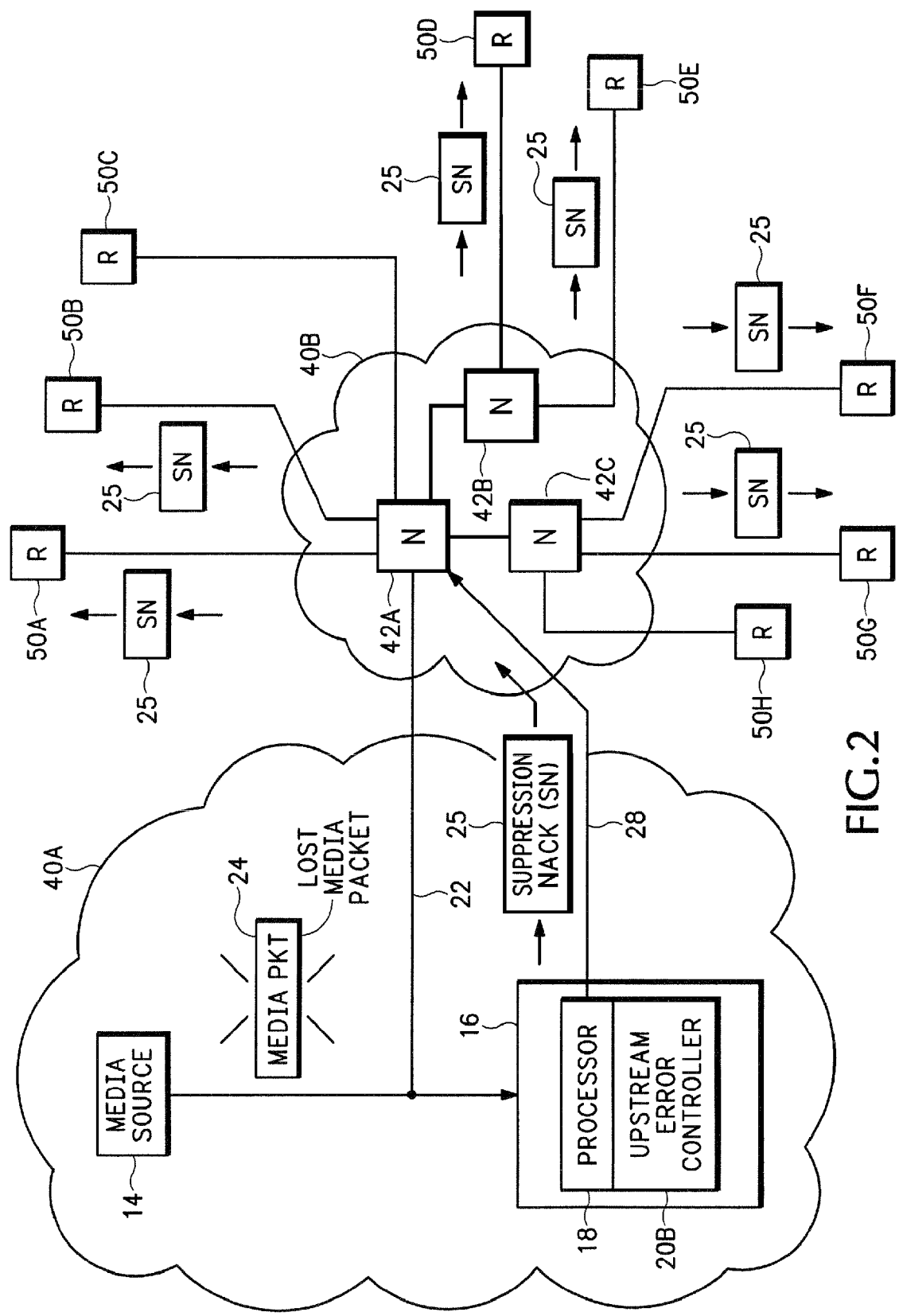
FIG. 2 shows how the upstream error controller in FIG. 1 suppresses NACKs for upstream packet loss.

Referring to FIG. 2, the upstream error controller 20B monitors the media stream 22 at network portion 40A upstream from a significant fraction of the receivers 50 receiving the media stream 22. The upstream error controller 20B can accordingly identify media packets 24 lost upstream of a significant fraction of the receivers 50. In this example, it is apparent that any media packets 24 not received by repair point 16 will also not be received by any of the receivers 50.

The upstream error controller 20B will accordingly send out a Suppression NACK (SN) message 25 to prevent the NACK implosion shown in FIG. 1. In one embodiment, the SN message 25 is multicast on a separate repair channel, connection, or session 28 to all of the receivers 50 that are members of the multicast group for media stream 22. In response to receiving the SN message 25, all of the receivers 50 suppress sending back NACKs after detecting the same lost media packet 24.

Figure 3A:
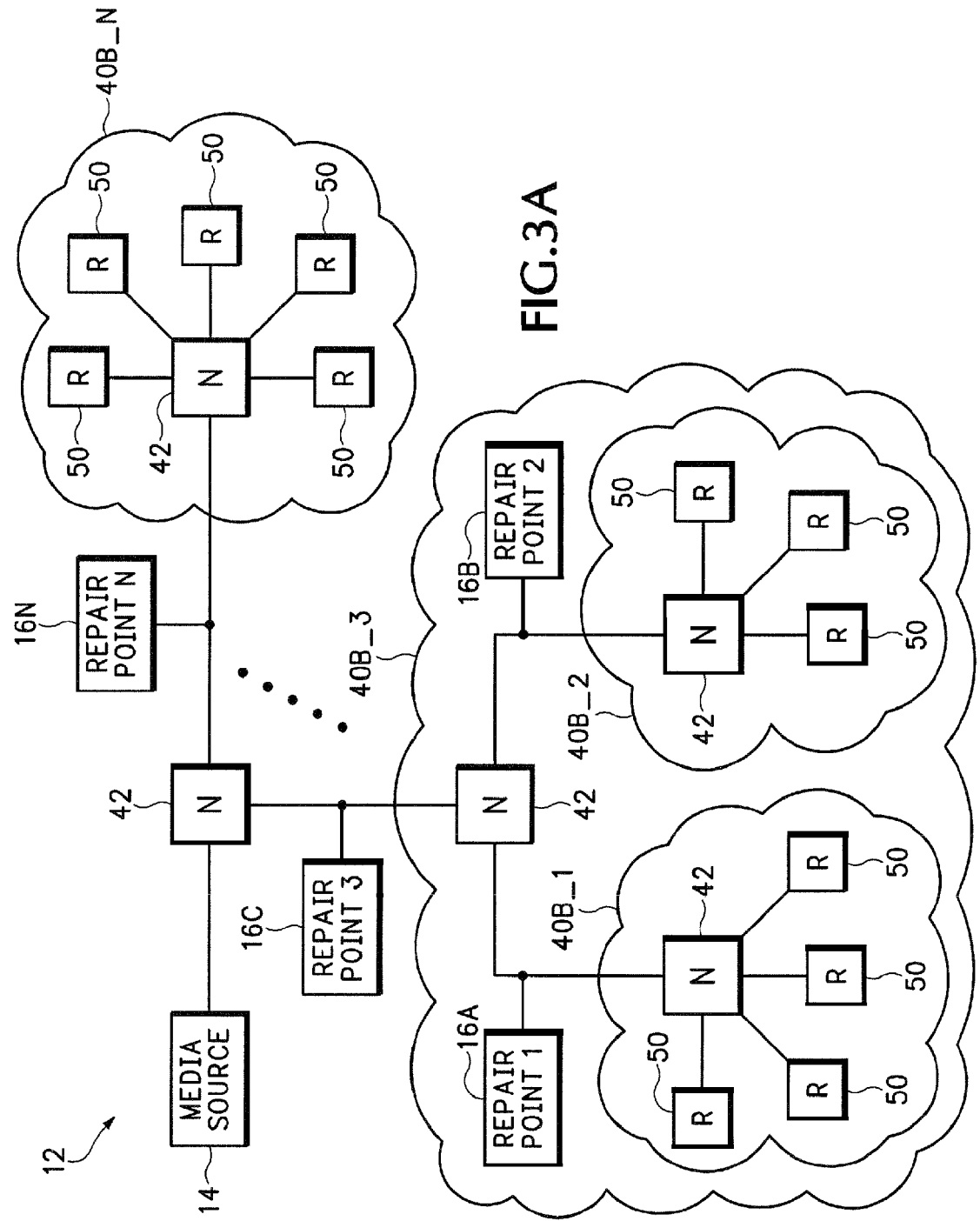
FIG. 3A shows different repair points used to detect upstream packet loss at different locations in a network.

It should be understood that the upstream network portion 40A and downstream network portion 40B may part of a larger network. Referring to FIG. 3A, there may be multiple downstream sub-networks 40B_1-40B_N that are each serviced by a different associated repair point 16A-16N, respectively. Each of these downstream sub-networks 40B_1-40B_N may still be served by the same media source 14. Thus, any particular repair point 16 would be upstream to what is referred to as a significant fraction of associated receivers 50. Alternatively, each repair point 16 may be described as having an associated set of downstream receivers 50.

Any combination of receivers 50 connected to the different downstream sub-networks 40B_1-40B_N could be members of the same multicast group. An upstream loss may be on a link leading only to a subset of the repair points 16 and correspondingly to a subset, but not all, of the downstream sub-networks 40B in network 12. In this case the NACK implosion may only apply to the one or more repair points 16 that was down-tree from the point of loss.

For example, a lost packet detected by repair point 16B may only cause a NACK implosion on downstream sub-network 40B_2. Similarly, a lost packet detected by repair point 16N may only cause a NACK implosion on downstream sub-network 40B_N.

The repair points 16 can be located anywhere in the overall network 12. It is also possible that some repair points 16 may be upstream of other repair points. For example, repair point 16C is upstream of repair points 16A and 16B. The downstream sub-networks 40B serviced by a particular repair point 16 may cover any combination or arrangement of nodes 42, sub-network branches, and receivers 50.

Packet Repair

Figure 3B:
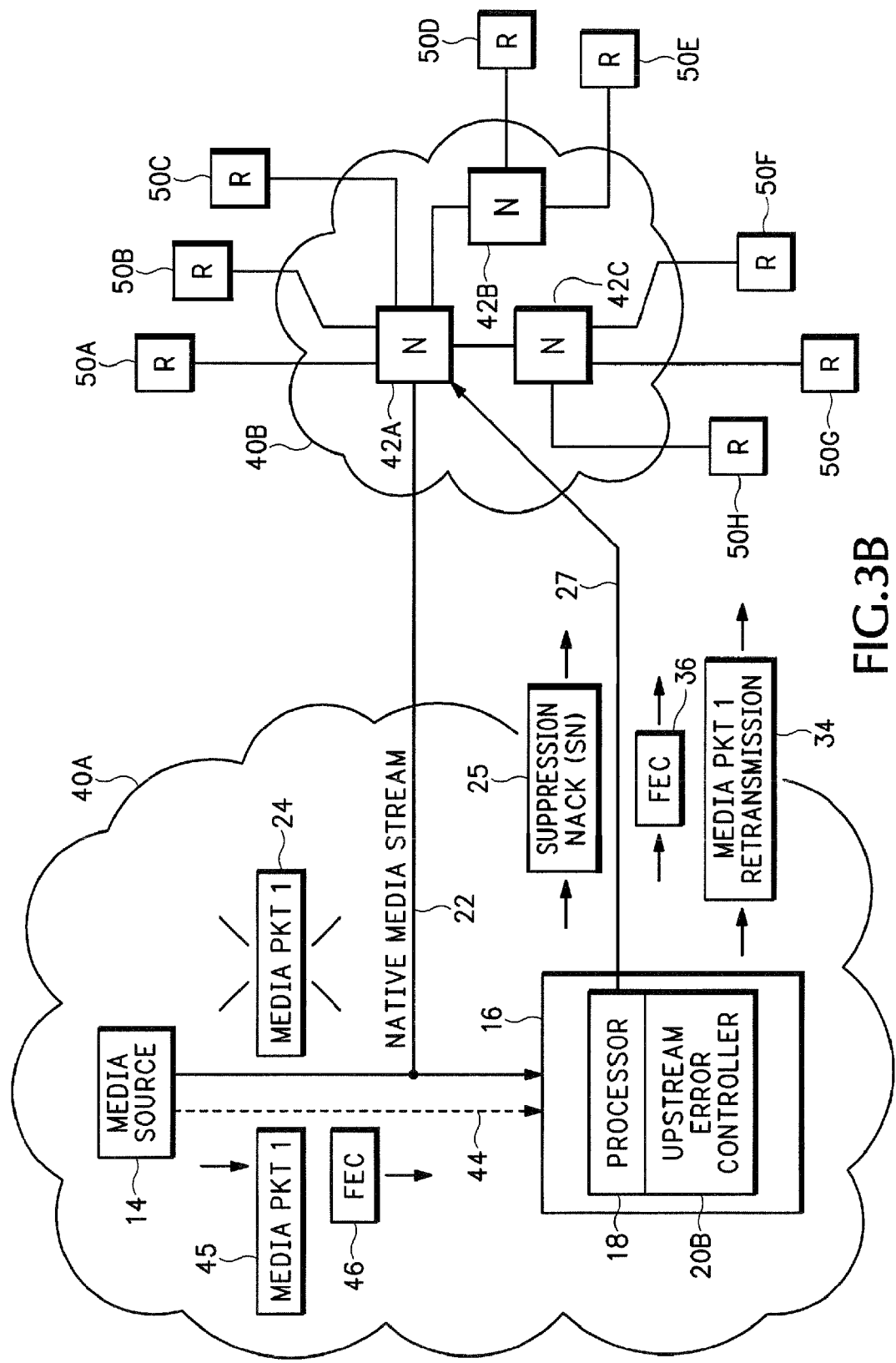
FIG. 3B shows how the upstream error controller in FIG. 1 both suppresses NACKs and sends out repair or retransmission packets.

Referring to FIG. 3B, there are typically three cases for upstream loss. A total outage is where the repair point 16 stops receiving packets for media stream 22 altogether. An un-repairable loss is not a complete outage, but the repair point 16 cannot repair the lost packets. For example, there may be too many lost packets to repair or the repair, point 16 may not have the data required to repair the media stream. A repairable loss is where the repair point 16 has the ability to repair the one or more lost packets.

FIG. 3B shows the repair point 16 receiving a separate backup data stream 44 that may be a redundant media stream 45 and/or an FEC stream 46. A scheme for providing a redundant media stream is described in copending U.S. patent application entitled: UNIFIED TRANSMISSION SCHEME FOR MEDIA STREAM REDUNDANCY, Filed: Mar. 14, 2007, Ser. No. 11/686,321 which is herein incorporated by reference.

The backup data stream 44 might only be sent to one or more repair points 16 and not transmitted all the way through network 40 to the receivers 50. For example, the one or more repair points 16 can join a second multicast group associated with the backup data stream 44. Accordingly, the media source 14 will only multicast the back up data stream 44 to the repair points 16 thus reducing bandwidth utilization in network 40.

Figure 4:
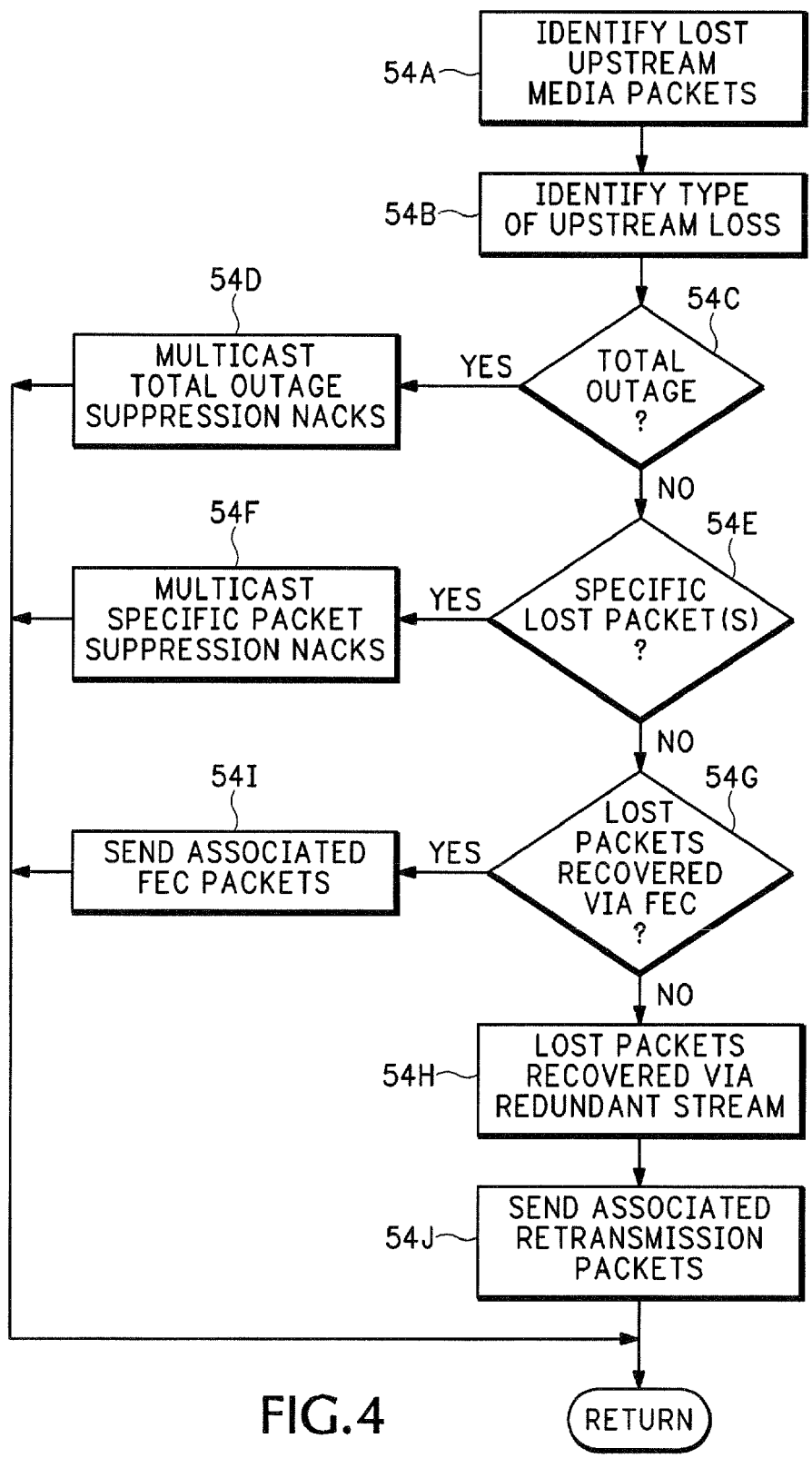
FIG. 4 is a flow diagram showing in more detail how the upstream error controller operates.

Referring to both FIG. 3B and FIG. 4, the upstream error controller 20B in operation 54A identifies lost upstream media packets 24 and identifies the type of loss in operation 54B. For example as described above, the upstream error controller may distinguish between a total media stream outage, un-repairable loss, and repairable loss. When a total outage is identified in operation 54C, the upstream error controller may multicast total outage suppression NACK 25 to the receivers 50 in operation 54D.

For example, all or a large portion of the media stream 22 may not be successfully received by repair point 16. The total outage suppression NACK 25 accordingly directs the receivers 50 to suppress all NACKs for all lost packets for some period of time. In one embodiment, the total outage NACK 25 is sent using a Real Time Control Protocol (RTCP) report. But any other type of messaging protocol could alternatively be used for sending the suppression NACK 25. The error controller 20B would then continue to periodically multicast the total outage NACK 25 until the native media stream 22 returns to repair point 16.

In operation 54E, the error controller 20B identifies one or more individual lost packets. Accordingly, the upstream error controller in operation 54F multicasts individual NACK suppression packets 25 associated with the specific missing media packets 24. These suppression packets 25 direct the receivers 50 to not send NACKs for the particular media packets identified in the suppression NACK 25, since those identified media packets will not be forthcoming. Multiple individual suppression NACKs can also be sent in the same suppression message 25.

There are two sub-cases where the identified lost upstream packets 24 are repairable and depend on whether the repair point 16 recovers the lost data via FEC or via a redundant media stream. When the backup data stream 44 comprises FEC packets 46, the lost upstream packets 24 are identified as recoverable via FEC in operation 54G. The FEC packets 36 used by repair point 16 to reconstruct the lost packets are then multicast to the receivers 50 in operation 54I. The receivers 50 then perform the corresponding reconstruction using the minimal number of FEC repair packets.

The lost media packets 24 may alternatively be recovered by the repair point 16 via redundant media stream 45. In this case, the upstream error controller 20B in operation 54H constructs RTP retransmission packets 34 from the redundant media stream 45. The retransmission packets 34 are then multicast over the multicast repair session 27 to the receivers 50 in operation 54J.

The upstream error controller 20B may also multicast a NACK, RTCP message, or suppression NACK 25 to the receivers 50 that identifies the particular type of packets 34 or 36 sent to repair the lost media packets.

Figure 5:
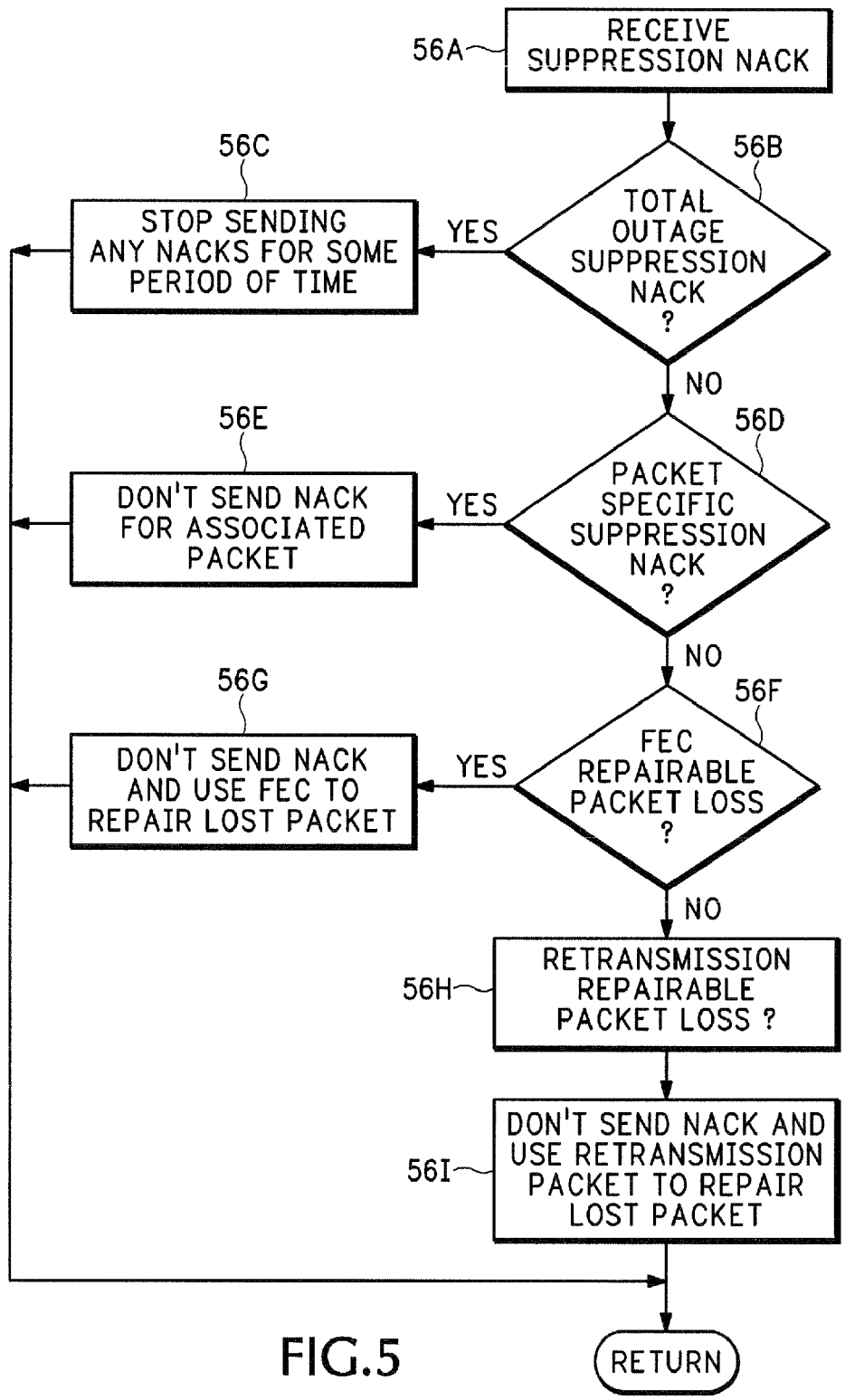
FIG. 5 is a flow diagram showing how the receivers respond to the upstream error controller.

FIG. 5 explains in more detail the operations performed by the receivers. Referring to FIGS. 3 and 5, computer processing logic in the receivers 50, such as a processor executing instructions is configured to detect lost packets in the media stream 22 and send lost packet notifications, such as NACKs 26 (FIG. 1), to the repair point 16. The computer logic in the receivers 50 is further configured in operation 56A to receive and detect suppression NACKs 25 from the repair point 16 that suppress the NACKs 26 that would have normally been sent out when a lost packet is detected.

The receiver in operation 56B determines when the suppression NACK 25 is associated with total media stream outage. For example, the NACK message 25 may include a tag identifying a total media steam outage. In this case, the receiver 50 stops sending any NACKs back to the repair point 16 for some predetermined period of time. The receiver 50 could alternatively identify the suppression NACK 25 as a packet specific suppression in operation 56D. Accordingly, the receiver in operation 56E will not send NACKs for the specific media packets identified in the suppression NACK 25.

For repairable packet losses, the receiver may receive some notification in operation 56F that the lost packet is repairable via FEC. This notification may be provided along with the FEC packets 36, the suppression NACK 25, or with some other message. The receiver in operation 56G then suppresses any NACKs that would have normally been sent and then uses the received FEC packets for repairing the lost packets.

Alternatively, the receiver may receive a notification in operation 56H that the lost packet is repairable via retransmission. This notification again may be provided along with the actual retransmission packets 34, in the suppression NACK 25, or in some other message. The receiver in operation 56I suppresses any NACKs that would have been normally sent and then uses the retransmission packets 34 received over the repair session 27 to repair the lost packets.

Hybrid Packet Repair For Downstream Packet Loss

Upstream packet repair can be combined with a hybrid packet repair scheme described in co-pending patent application Ser. No. 11/735,930, entitled: HYBRID CORRECTIVE SCHEME FOR DROPPED PACKETS, filed Apr. 16, 2007 which is herein incorporated by reference. The hybrid packet repair scheme adaptively switches among unicast retransmission, multicast retransmission, and FEC depending on the receiver population and the nature of the error prompting the repair operation.

When there is a packet loss in the downstream network portion 40B in FIG. 1, NACKs 26 are still sent by receivers 50. The hybrid packet repair scheme then determines the most efficient unicast, multicast, or FEC scheme for repairing the lost downstream packets according to the received NACK pattern.

Figure 6:
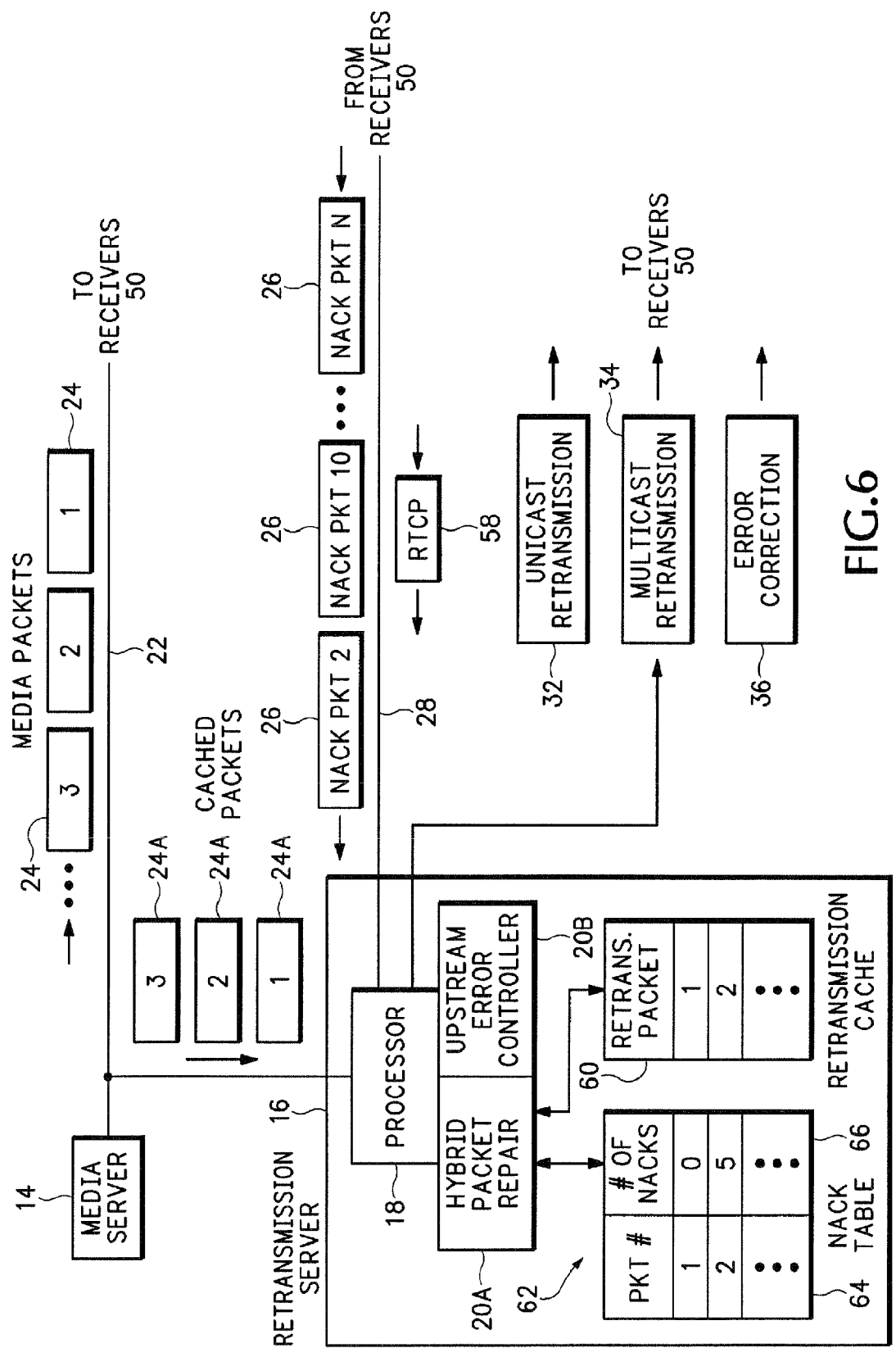
FIG. 6 is a block diagram showing how the upstream error controller can be used in conjunction with a hybrid packet repair scheme.

FIG. 6 shows the retransmission server (repair point) 16 in more detail. The processor 18 operates both a hybrid packet repair scheme 20A and the upstream error controller 20B that in one embodiment are computer executable software instructions. For each media channel 22, the repair point 16 caches the packet data 24A necessary for repairing any of the lost packets in media channel 22. The hybrid packet repair scheme 20A operates in conjunction with a retransmission cache 60 that caches the media packets 24A transmitted by the media server 14. Retransmission cache 60 is used in conjunction with a NACK table 62 that counts the number of NACKs 26 received for each cached media packet 24A. For example, the NACKs 26 identify the sequence numbers for lost media packets. Each time a NACK 26 is received by repair point 16, a NACK count 66 for the associated lost packets 64 are incremented in NACK table 62.

Based on the NACK pattern in NACK table 62, the hybrid packet repair scheme 20A sends different combinations of unicast retransmission packets 32, multicast retransmission packets 34 and/or FEC packets 36 to the receivers 50. The repair packets are used to replace the lost packets identified in the NACK messages 26.

The repair point 16 can also gauge the intensity of a NACK implosion even when NACKs might be lost due to congestion or the inability of the repair point to receive and process all the NACKs 26. The three loss cases of individual loss, correlated loss, and outage on the downstream primary multicast stream 22 can also be analyzed. In the case of correlated loss, the repair point 16 can also determine enough about the loss pattern to choose among unicast packet retransmission, mulitcast packet retransmission, and FEC repair.

Combining Hybrid Packet Repair with Upstream Packet Loss

Upstream packet loss detection provided by the upstream error controller 20B can be combined with the hybrid packet repair provided by the hybrid packet repair scheme 20A. Whenever a media packet 24 is identified as lost in the upstream portion 40A of the packet switched network (FIG. 1), the upstream error controller 20B increases the lost packet count for each identified lost media packet 24 in NACK table 62. The packet count 66 is increased by approximately the number of receivers 50 in the multicast group associated with the media stream 22.

For example, two different media packets 24 may be identified by the upstream error controller 20B as being lost in the upstream network portion 40A. The upstream controller 20B may have also previously determined an approximate number of receivers 50 in the multicast group receiving the media stream 22. For example, the receivers 50 may periodically send RTCP reports 58 to repair point 16 identifying their associated media streams. The repair point uses these RTCP reports 58 to identify the number of receivers 50 actively receiving different media streams. The upstream error controller 20B then increases the NACK count 66 for the two lost media packets in media stream 22 by the number of identified active receivers. Identifying receiver density is further explained in co-pending application Ser. No. 11/735,930 entitled: HYBRID CORRECTIVE SCHEME FOR DROPPED PACKETS filed Apr. 16, 2007 which has already been incorporated by reference.

Selecting Repair Schemes

FIG. 7 shows different NACK patterns 70 that may determine the type of repair scheme 32, 34, or 36 used to repair lost packets. It should be understood that the example NACK patterns shown in FIG. 7 are only for illustrative purposes. The actual number of NACKs and the number of associated lost packets considered by the hybrid packet repair scheme 20A may vary according to the type of network, network bandwidth, type of transmitted media, number of receivers 50, etc.

Referring to FIGS. 2, 6 and 7, a first example NACK pattern 70A in NACK table state 62A shows one NACK received for a first media packet and one NACK received for a seventh media packet. In this example, the hybrid repair scheme 20A may determine that sending two unicast retransmission packets 32 (FIG. 6) is the most efficient scheme for repairing the two lost packets. For example, sending two unicast retransmission packets 32 would use less network bandwidth than sending two multicast retransmission packets.

A second example NACK pattern 70B in NACK table state 62B shows several hundred NACKs received only for the third media packet. In this state, the hybrid packet repair scheme 20A may determine that sending one multicast retransmission packet 34 for the third lost packet is most efficient. For example, sending one multicast retransmission packet 34 uses less bandwidth than sending 200 separate unicast packets 32 to each one of the individual receivers sending one of the 200 NACKs 26.

As described above, if the third packet was lost in the upstream network portion 40A (FIG. 2), then the upstream error controller 20B may have previously sent out a suppression NACK 25 (FIG. 2) and then assumed, based on the RTCP reports 58 (FIG. 6), that 200 receivers would have eventually sent NACKs back to the repair point 16.

Accordingly, the upstream error controller 20B operates as a proxy for the receivers 50 and artificially adds 200 NACKs to the third packet in table state 62B. The hybrid packet repair scheme 20A then operates in the manner described above by selecting a particular repair scheme based on the number and pattern of NACKs in table state 62B.

A third example NACK pattern 70C in NACK table state 62C indicates three different packets have been lost by multiple different receivers 50. In this condition, the hybrid packet repair scheme 20A may determine that sending two FEC packets is the most efficient way to repair the lost packets. For example, two FEC packets may be able to repair all three lost packets 1, 2, and 6. Thus, multicasting two FEC packets 36 (FIG. 2) would be more efficient than sending 110 individual unicast retransmission packets 32 or sending three separate multicast retransmission packets 34.

The FEC packets 36 can work with any number of packet-level FEC schemes, and do not require any particular form of FEC. FEC mapping onto IP protocols is described in a large number of Internet Engineering Task Force (IETF) Request For Comments (RFCs) and drafts, such as RFC3009, RFC3452, RFC3695, and therefore is not described in any further detail.

A fourth example NACK pattern 70D in NACK table state 62D indicates five different packets 1, 2, 4, 5, and 7 have been lost. In this case a combination of unicast retransmission packets 32 and multicast retransmission packets 34 may be the most efficient repair scheme. For example, unicast retransmission packets 32 may be sent to the relatively small number of individual receivers that lost packets 1, 2, 5, ad 7 and a single multicast retransmission packet 34 may be sent to all of the associated receivers 50 for lost packet 4.

The NACK pattern 70D could be a result of a combination of both upstream and downstream packet losses. For example, packet 4 could have been lost in the upstream network portion 40A and packets 1, 2, 5, and 7 could have been lost somewhere in the downstream network portion 40B.

In this example, both the upstream error controller 20B and the hybrid packet repair scheme 20A work in combination to record the NACK pattern 70D in NACK table state 62D. The upstream error controller 20B detects lost packet 4, sends suppression NACK 25, and then adds the 130 NACK count to table 62D for lost packet 4 on behalf of the associated receivers 50. In conjunction, the hybrid packet repair scheme 20A increments the NACK count for the lost packets 1, 2, 5, and 7 according to the number of NACKs 26 that are actually received by the repair point 16 from particular receivers 50.

A fifth example NACK pattern 70E in NACK table state 62E indicates every one of the packets 1-7 has been lost by different combinations of receivers. In this condition, the hybrid packet repair scheme 20A or the upstream error controller 20B may determine that there is insufficient bandwidth to repair any of the lost packets and may abort any attempt to repair lost packets. In addition, the upstream error controller 20B may also send out a total outage suppression NACK 25 or specific packet suppression NACKs 25 to prevent a NACK implosion.

In the case of upstream loss, the bandwidth computation can be more aggressive about using bandwidth for multicast or FEC repair. The reason is that when the packet is lost upstream it does not consume any bandwidth on the downstream links. Therefore, sending as many retransmission or FEC packets as the number of lost upstream packet may not require substantially any extra bandwidth.

The upstream packet loss may be separately identified and separate criteria used by the hybrid packet repair scheme 20A for determining whether to use a retransmission scheme, FEC repair, or abort packet repair. Referring still to FIG. 7, a NACK table 62F may include a first column 63A associated with the number of lost upstream packets and a second column 63B associated with the number of lost downstream packets.

The count value inserted by upstream error controller 20B in column 63A may be the number of projected NACKs that would have normally been returned by the downstream receivers 50 if no suppression NACK was sent. Alternatively, the count value in column 63A may simply be the number of detected lost upstream packets. The count value inserted by hybrid packet repair scheme 20A in column 63B is the number of NACKs returned by the receivers 50 due to downstream packet loss.

In one comparison, the total number of NACKs are the same for both table 62E and table 62F. Recall that the hybrid packet repair scheme 20A may have decided to not provide any repair based on the NACK pattern in table 62E. However, isolating the number of lost upstream packets in column 63A of table 62F may change the previous no-repair decision made by the hybrid packet repair scheme 20A. For example, as explained above, the repair scheme 20A may determine that little or no additional bandwidth is required for repairing the lost upstream packets identified in column 63A. Accordingly, the repair scheme may apply a heavier weight or bias toward correcting the upstream packets identified in column 63A. A separate criteria or weighting similar to that described above for table states 62A-62E is then used when deciding how to correct the lost downstream packets identified in column 63B.

Figure 8:
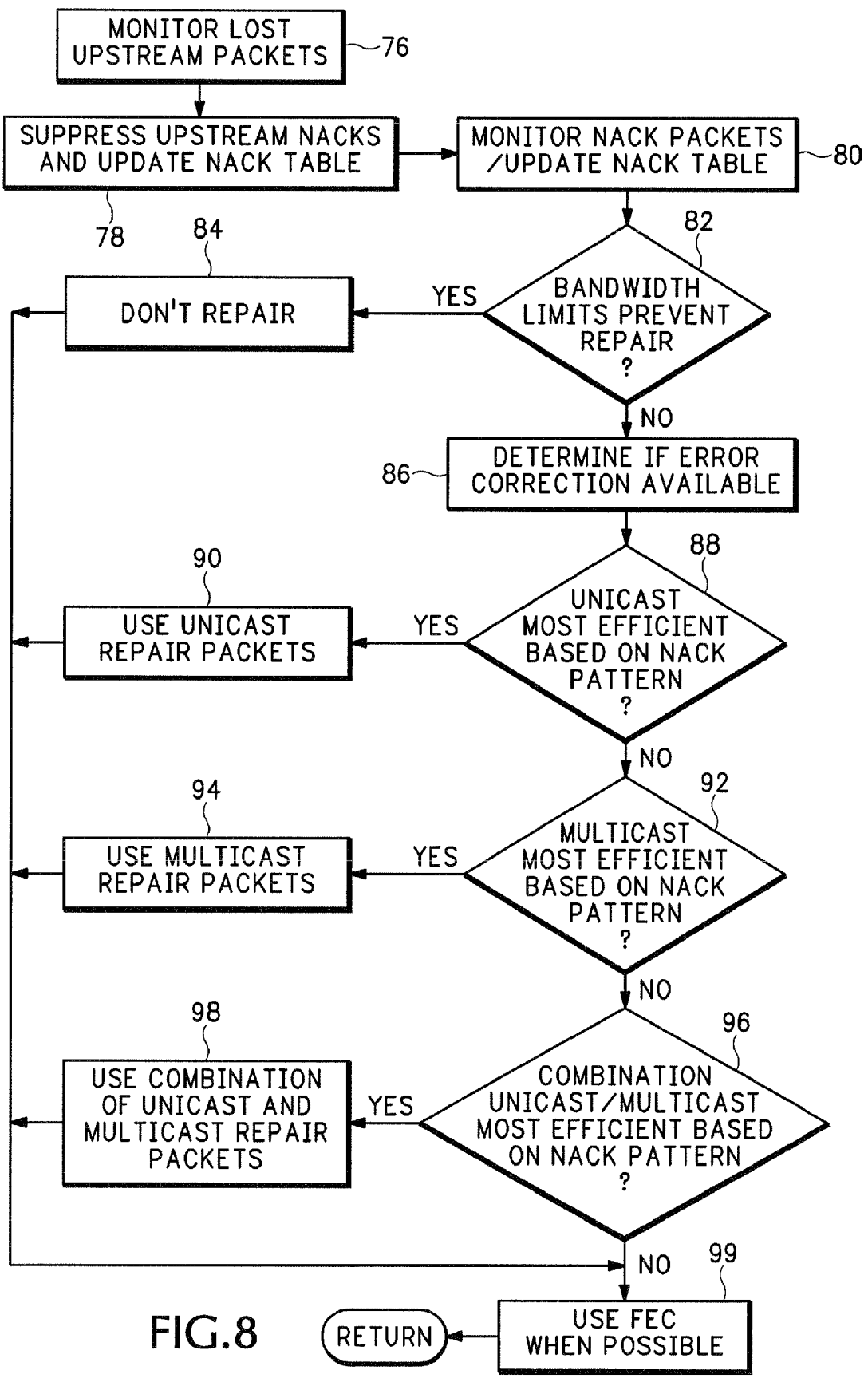
FIG. 8 is a flow diagram showing in more detail the combined operation of the upstream controller and hybrid packet repair scheme.

FIG. 8 shows another example of operations performed by the hybrid packet repair scheme 20A in combination with the upstream error controller 20B. In order to repair the media stream, the repair point 16 needs to determine which packets to retransmit using unicast packets 32, which packets to retransmit using multicast packets 34, whether to switch to FEC-based repair 36 rather than retransmitting, or whether to give up when there is insufficient aggregate bandwidth to sufficiently repair the media stream 22 and satisfy the receivers 50.

Operation 76 monitors for packets lost in the upstream network portion 40A. In operation 78, suppression NACKs may be multicast to associated receivers to suppress the impending NACK implosion. Operation 78 will also account for the suppressed NACKs by increasing the NACK count in the NACK table 62 by the number of associated media stream receivers 50. In operation 80, NACK packets 26 are monitored for any other downstream packet loss.

As described above, operations 78 and 80 may add to one common upstream/downstream NACK count value as shown in tables 62A-62E in FIG. 7. Alternatively, operation 78 may separately count and track the lost upstream packets and operation may separately count and track the lost downstream packets. Any subsequent decisions regarding which type of repair, if any, to provide may then be based on either a combined NACK count as shown in tables 62A-62E in FIG. 7 or based on the separate upstream and downstream NACK or lost packet counts as shown in table 62F in FIG. 7

The number and/or pattern of monitored NACKs in combination with identified upstream packet loss and limits on network bandwidth may indicate in operation 82 that no repair should be performed. Accordingly, the identified lost media packets 24 are not repaired in operation 84.

Otherwise, operation 86 determines if error correction is available for repairing the lost packets. For example, when a limited number of different packets are indicated as lost, error correction packets 36 may be sent to the receivers 50. The receivers then locally recreate the data from the lost packets using the FEC packets 36.

In operation 88, the NACK pattern in table 62 (FIG. 2) may indicate that unicast repair is the most efficient scheme for repairing lost packets. Accordingly, the identified lost packets are sent using unicast retransmissions in operation 90 to the specific receivers identifying the lost packets.

In operation 92, the NACK pattern in table 62 may indicate that multicast retransmission is the most efficient scheme for repairing lost packets. Accordingly, multicast retransmissions of the identified lost packets are sent in operation 94 to all of the receivers in the multicast group. In operation 96, the NACK pattern in table 62 may indicate that both unicast retransmission and multicast retransmission should be used. Accordingly in operation 98 unicast retransmissions of certain lost packets are sent to specific receivers 50 and multicast retransmissions of other lost packets are sent to all of the receivers 50 in the multicast group. In operation 99, forward error correction may be used whenever applicable to improve repair efficiency.

Establishing Media Channels

Referring to the figures above, a given media channel 22 has a primary Multicast Real Time Protocol (RTP) session along with a corresponding Real Time Control Protocol (RTCP) control channel. The media channel 22 may have a unicast repair RTP/RTCP session which can be established on demand according to the scheme described in U.S. patent application entitled: RETRANSMISSION-BASED STREAM REPAIR AND STREAM JOIN, filed: Nov. 17, 2006, Ser. No. 11/561,237 which is herein incorporated by reference. This RTP/RTCP session may be used for unicast retransmission repair when the hybrid packet repair scheme 20A determines that unicast retransmission is the most effective way to repair a particular error.

A second RTP/RTCP multicast session is added for multicast repair. The multicast retransmissions 34 can be sourced by the same retransmission server 16 at the same source address as the feedback target address for the main multicast RTP session. However, a different destination group address is used. Receivers 50 participating in the repair scheme can join this SSM group (and leave) at the same time they join the main SSM RTP session. This multicast repair session is used for both sending the multicast retransmission packets 34 using the RTP retransmission payload format and for sending FEC repair packets 36 using the native payload type for an in use FEC scheme. The two forms of unicast and multicast retransmission are distinguished by the receivers 50 using standard RTP conventions for payload type multiplexing in a single session.

Other unicast receiver feedback 58 (FIG. 6) is sent to the feedback address for the primary media session 22, and therefore is available to the retransmission server 16. This feedback information in one embodiment as described above may be RTCP packets containing RTCP receiver reports. The retransmission server 16 uses the RTCP reports to estimate a population of the receivers 50 that are "homed" on retransmission server 16 for repairs. This receiver population is dynamic and approximate since receivers come and go, RTCP-Receiver Report packets may be lost, and mapping of receivers 50 to repair points can change.

Based on the identified population of receivers 50 and the pattern of NACKs 26, either RTP unicast repair packets 32 are sent via unicast retransmission, RTP multicast repair packets 34 are sent via SSM multicast retransmission, or RTP FEC repair packets 36 are sent using a SSM multicast retransmission.

Several preferred examples of the present application have been described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A method, comprising:
monitoring, by a repair point, a primary multicast group comprising multiple receivers for receiving a native media stream, wherein the multiple receivers are connected to a media source through a plurality of network nodes;
detecting, at the repair point, packet losses in the native media stream prior to the loss being detected by the multiple receivers, wherein detecting, at the repair point, packet losses in the native media stream comprises detecting at the repair point the packet losses wherein the repair point is configured to receive the native media stream prior to the multiple receivers;
identifying, by the repair point, a group of receivers which were configured to receive the lost packets;
creating, by the repair point, a second multicast group comprising the identified group of receivers which were configured to receive the lost packets;
joining by the repair point, the second multicast group;
sending, by the repair point, out suppression notices in the second multicast group for the identified lost packets that keep the receivers from sending back lost packet notices;
dynamically selecting, by the repair point, different types of correction or retransmission schemes for correcting or replacing the lost packets based on a number lost packet notices that would have normally been received from the receivers if the suppression notices were not sent;
identifying, by the repair point, backup data associated with the identified lost packets; and
multicasting, by the repair point, the identified backup data to the receivers in the second multicast group for repairing the lost packets, based on the selected type of scheme, wherein the identified backup data is sent to the at least one repair point through a repair channel which is separate from a native media channel.

2. The method according to claim 1, further comprising multicasting the suppression messages to all of the receivers that are members of the primary multicast group over the repair channel separate from the native media steam.

3. The method according to claim 1, further comprising sending complete outage suppression messages when the entire native media stream is disrupted that cause to the receivers to suppress sending any lost packet messages.

4. The method according to claim 3, further comprising sending specific packet suppression messages that cause the receivers to only suppress sending lost packet messages for identified lost media packets.

5. The method according to claim 1, further comprising:
tracking a pattern of packets lost in the native media stream; and
sending out Forward Error Correction (FEC) packets to the receivers when the number and pattern of lost packets is more efficiently corrected by the receivers using FEC; and sending out retransmissions of the lost packets when the number and pattern of lost packets is more efficiently corrected by retransmitting the lost packets.

6. A computer-readable memory device having instructions stored thereon that, in response to execution by a processing device, cause the processing device to perform operations comprising:
monitoring a primary multicast group comprising multiple receivers for receiving a native media stream, wherein the multiple receivers are connected to a media source through a plurality of network nodes;
detecting, at a repair point, packet losses in the native media stream prior to the loss being detected by the multiple receivers, wherein detecting, at the repair point, packet losses in the native media stream comprises detecting at the repair point the packet losses wherein the repair point is configured to receive the native media stream prior to the multiple receivers;
identifying, by the repair point, a group of receivers which were configured to receive the lost packets;
creating a second multicast group comprising the identified group of receivers which were configured to receive the lost packets;
joining the second multicast group;
sending, by the repair point, out suppression notices in the second multicast group for the identified lost upstream packets that keep the receivers from sending back lost packet notices;
dynamically selecting, by the repair point, different types of correction or retransmission schemes for correcting or replacing the lost packets based on a number lost packet notices that would have normally been received from the receivers if the suppression notices were not sent;
identifying a backup data associated with the identified lost packets; and
multicasting the identified backup data to the receivers in the second multicast group for repairing the lost packets, based on the selected type of scheme, wherein the identified backup data is sent to the at least one repair point through a repair channel which is separate from a native media channel.

7. The computer-readable memory device of claim 6, wherein the operations further comprise multicasting the suppression messages to all of the receivers that are members of the primary multicast group over the repair channel separate from the native media steam.

8. The computer-readable memory device of claim 6, wherein the operations further comprise sending complete outage suppression messages when the entire native media stream is disrupted that cause to the receivers to suppress sending any lost packet messages.

9. The computer-readable memory device of claim 8, wherein the operations further comprise sending specific packet suppression messages that cause the receivers to only suppress sending lost packet messages for identified lost media packets.

10. The computer-readable memory device of claim 6, wherein the operations further comprise:
tracking a pattern of packets lost in the native media stream; and
sending out Forward Error Correction (FEC) packets to the receivers when the number and the pattern of lost packets is more efficiently corrected by the receivers using FEC; and sending out retransmissions of the lost packets when the number and the pattern of lost packets is more efficiently corrected by retransmitting the lost packets.

11. A system comprising:

a primary multicast group comprising multiple receivers for receiving a native media stream, wherein the multiple receivers are connected to a media source through a plurality of network nodes; and a repair server configured to:

identify lost packets in the native media stream prior to the loss being detected by the multiple receivers, wherein the repair point is configured to receive the native media stream prior to the multiple receivers;

identify a group of receivers which were configured to receive the lost packets;

create a second multicast group comprising the identified group of receivers which were configured to receive the lost packets;

send out suppression notices in the second multicast group for the identified lost upstream packets that keep the receivers from sending back lost packet notices;

dynamically select, different types of correction or retransmission schemes for correcting or replacing the lost packets based on a number lost packet notices that would have normally been received from the receivers if the suppression notices were not sent;

identify a backup data associated with the identified lost packets; and multicast the identified backup data to the receivers in the second multicast group for repairing the lost packets, based on the selected type of scheme, wherein the identified backup data is sent to the at least one repair point through a repair channel which is separate from a native media channel.

12. The system of claim 11, wherein the repair server is further configured to multicast the suppression messages to all of the receivers that are members of the primary multicast group over the repair channel separate from the native media steam.

13. The system of claim 11, wherein the repair server is further configured to:

send complete outage suppression messages when the entire native media stream is disrupted that cause to the receivers to suppress sending any lost packet messages; and send specific packet suppression messages that cause the receivers to only suppress sending lost packet messages for identified lost media packets.

14. The system of claim 13, wherein the repair server is further configured to:

track a pattern of packets lost in the native media stream; and send out Forward Error Correction (FEC) packets to the receivers when the number and the pattern of lost packets is more efficiently corrected by the receivers using FEC; and send out retransmissions of the lost packets when the number and the pattern of lost packets is more efficiently corrected by retransmitting the lost packets.

* * * * *